(12) United States Patent
Soucek

(10) Patent No.: US 6,463,828 B1
(45) Date of Patent: Oct. 15, 2002

(54) EXPANSION ENGAGEMENT CRANK ASSEMBLY

(76) Inventor: Jeffrey A. Soucek, 8 Sunbury Dr., Aliso Viejo, CA (US) 92656

( * ) Notice: Subject to any disclaimer, the term of this patent is extended or adjusted under 35 U.S.C. 154(b) by 106 days.

(21) Appl. No.: 09/656,768

(22) Filed: Sep. 7, 2000

(51) Int. Cl.[7] .................................................. G05G 1/14
(52) U.S. Cl. ..................................... 74/594.1; 403/370
(58) Field of Search ................. 74/594.1; 403/365–368, 403/370–372

(56) References Cited

U.S. PATENT DOCUMENTS

| | | | |
|---|---|---|---|
| 622,644 A | * 4/1899 | Annable | 74/594.1 |
| 623,373 A | * 4/1899 | Jerome | 74/594.1 |
| 624,232 A | * 5/1899 | Marty, Jr. | 403/370 |
| 630,176 A | * 8/1899 | Brown | 403/370 |
| 658,624 A | * 9/1900 | Egger | 74/594.1 |
| 3,508,618 A | * 4/1970 | Walberg | 403/370 |
| 5,924,336 A | * 7/1999 | Richardson | 74/594.1 |
| 6,116,114 A | * 9/2000 | Edwards | 74/594.1 |

FOREIGN PATENT DOCUMENTS

GB     4599 A  *  3/1899    ................. 74/594.1

OTHER PUBLICATIONS

"Sweet Wings", world wide web Nov. 11, 2000, one page.

* cited by examiner

Primary Examiner—Chong H. Kim
(74) *Attorney, Agent, or Firm*—Stetina Brunda Garred & Brucker

(57) ABSTRACT

An expansion engagement crank assembly for a bicycle. The assembly includes a female crank arm, a male crank arm, and a connector for connecting the female arm and the male arm. The female arm has a shaft sleeve attached at one end, the sleeve having an inboard end, an outboard end, and a bore originating at the inboard end. The bore is bounded by a mating surface and a a fastener surface.

The male arm has a shaft attached at one end and the shaft has a radially expandable inboard end and an outboard end. The inboard end of the shaft is sized for insertion within the bore of the sleeve and has a complimentary mating exterior surface for engaging the mating surface bounding the bore. The shaft additionally has an interior coupling surface defining a passage extending through the shaft from the inboard end to the outboard end.

The connector is sized for placement within the bore of the sleeve and the passage of the shaft. The connectors also shaped for engaging the fastener surface bounding the bore and for engaging the coupling surface defining the passage to connect the male arm with the female arm. The connector is additionally shaped to radially expand the mating surface of the shaft into an engaged position with the mating surface of the sleeve when the connector connects the male arm and female arm.

5 Claims, 4 Drawing Sheets

Fig, 1

EXPANSION ENGAGEMENT CRANK ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention relates generally to crank assemblies for bicycles, and more particularly to a crank assembly having a radially expandable male crank arm with an exterior mating surface, a female crank arm having with a bore bounded by a cooperatively engageable mating surface for receiving and engaging the male arm, and a connector for expanding the male crank arm and for connecting the male and female arms.

BACKGROUND OF THE INVENTION

As is known in the art, bicycles are provided with a pedal, or crank, assembly for powering the bicycle. The crank assembly typically includes a pair of crank arms each having a foot pedal mounted outboard at zone end. The opposite ends of the crank arms are connected by a drive shaft, and a drive sprocket is attached to the driveshaft near one of the crank arms to function as the drive gear for a chain drive system. The remainder of the drive shaft is rotatably mounted within a generally cylindrical bottom bracket. The interior of the bottom bracket is normally provided with a pair of annular race bearings within which the shaft rests and is free to rotate. Typically, the bracket also has two thrust bearings to prevent axial movement of the crank arms and a spacer to axially position the race bearings and thrust bearings.

For most crank assembly applications, it is very desirable for the crank arms and shaft to rotate in unison. Any slippage in the connection between the crank arms and shaft reduces the efficiency of the crank assembly. Moreover, pedaling can be uncomfortable if the crank arms periodically slip in and out of engagement with the drive shaft. Thus, the drive shaft and crank arms are often provided with cooperatively engageable splined surfaces to promote a tight connection between the elements. Typically, the ends of the shaft have an exterior splined surface for engaging splined bores disposed in the crank arms.

While there are a number of crank assembly designs in the prior art, the splined connections currently utilized often compromise tightness and durability of the connected elements, or they tend to be expensive to fabricate. For example, some crank assemblies are designed with loosely mated splines in order to reduce manufacturing costs. As a result, the assemblies tend to be less efficient because the gaps between splines allow the crank arms to slip across the surface of the shaft until the splines engage. In addition because splines often have a thin tip and a relatively thick base, the gaps are larger if only the tips engage. Furthermore, large gaps allow the splines to bump and grind against each other to such an extent that pedaling is uncomfortable Bumping and grinding can also cause premature failure of the assembly.

To address these problems, some crank assemblies are fabricated with very small dimensional tolerances to create a tighter fit between the splines. This approach, however, significantly increases manufacturing costs because more sophisticated fabrication procedures and high precision machine tools are required to fabricate the assembly. Still Other crank assemblies have splines sized for an interference fit such that the shaft and crank arms are pounded into an engaged position. This solution provides a snug fit, however, the mechanical strength and stiffness of the splines are altered when the splines are deformed as part of the forced engagement. Additionally, the splines and thrust bearings can be damaged when the shaft and crank arms are forcibly engaged, and the race bearings can be damaged if the pounding force is applied at an angle to the shaft.

In response to these tradeoffs, two piece crank assemblies have been developed in which one crank arm has an externally splined male shaft, and the opposite arm has an internally splined female shaft sleeve for receiving and engaging the shaft. This design eliminates the need to fabricate a separate shaft, however, two piece assemblies have heretofore been less durable. For instance, the female sleeve is usually split longitudinally, that is, it has a C-shaped profile when viewed from the end. With this configuration, the sleeve wraps around the shaft and one or more pinch bolts close the sleeve into an engaged position with the shaft. This design initially provides a tight fit between the shaft and sleeve, however, rigorous pedaling creates shaft stresses and bending moments which can deform the sleeve and pull the sleeve apart along the split. As a result, the tightness of the fit tends to deteriorate with usage.

In view of the above considerations, a primary object of the present invention is to provide a two piece crank assembly in which a splined male shaft is radially expanded into an engaged position with an internally splined female shaft sleeve to minimize gaps between the splines.

Another object of the present invention is to provide a two piece crank assembly in which the splined working surfaces are radially supported and fixed in an engaged position to maintain tight engagement over the operating life of the crank assembly.

Yet another object of the present invention is to provide a crank assembly which is relatively inexpensive to manufacture.

These and other objects of the present invention will become apparent throughout the description thereof which now follows.

SUMMARY OF THE PRESENT INVENTION

The present invention is an expansion engagement crank assembly for a bicycle. The assembly includes a female crank arm, a male crank arm, and a connector for connecting the female arm and the male arm. The female arm has a shaft sleeve attached at one end, and the sleeve has an inboard end, an outboard end and a bore originating at the inboard end. The bore is bounded by a mating surface and a fastener surface.

The male arm has a shaft attached at one end, and the shaft has a radially expandable inboard end and an outboard end. The inboard end of the shaft is sized for insertion within the bore of the sleeve sand has a complimentary mating exterior surface for engaging the mating surface bounding the bore. The shaft additionally has an interior coupling surface defining a passage extending through the shaft from the inboard end to the outboard end.

The connector is sized for placement within the bore of the sleeve and the passage of the shaft. The connector is also shaped for engaging the fastener surface bounding the bore and for engaging the coupling surface defining the passage to connect the male arm with the female arm. The connector is additionally shaped to radially expand the mating surface of the shaft into an engaged position with the mating surface of the sleeve when the connector connects the male arm and female arm.

The crank assembly here taught thus provides an effective mechanical joint to minimize slippage of the crank arms when a bicyclist pedals the assembly. In addition, the connector radially supports the shaft and shaft sleeve so they are maintained in an engaged position. Furthermore, the assembly is relatively inexpensive to manufacture because the shaft and shaft sleeve can be fabricated with greater dimensional tolerances and a tight fit between the shaft and shaft sleeve can be achieved by expansion engagement.

BRIEF DESCRIPTION OF THE DRAWINGS

An illustrative and presently preferred embodiment of the present invention is shown in the accompanying drawings in which.

DETAILED DESCRIPTION OF THE PREFERRED EMBODIMENT

Figure 1:
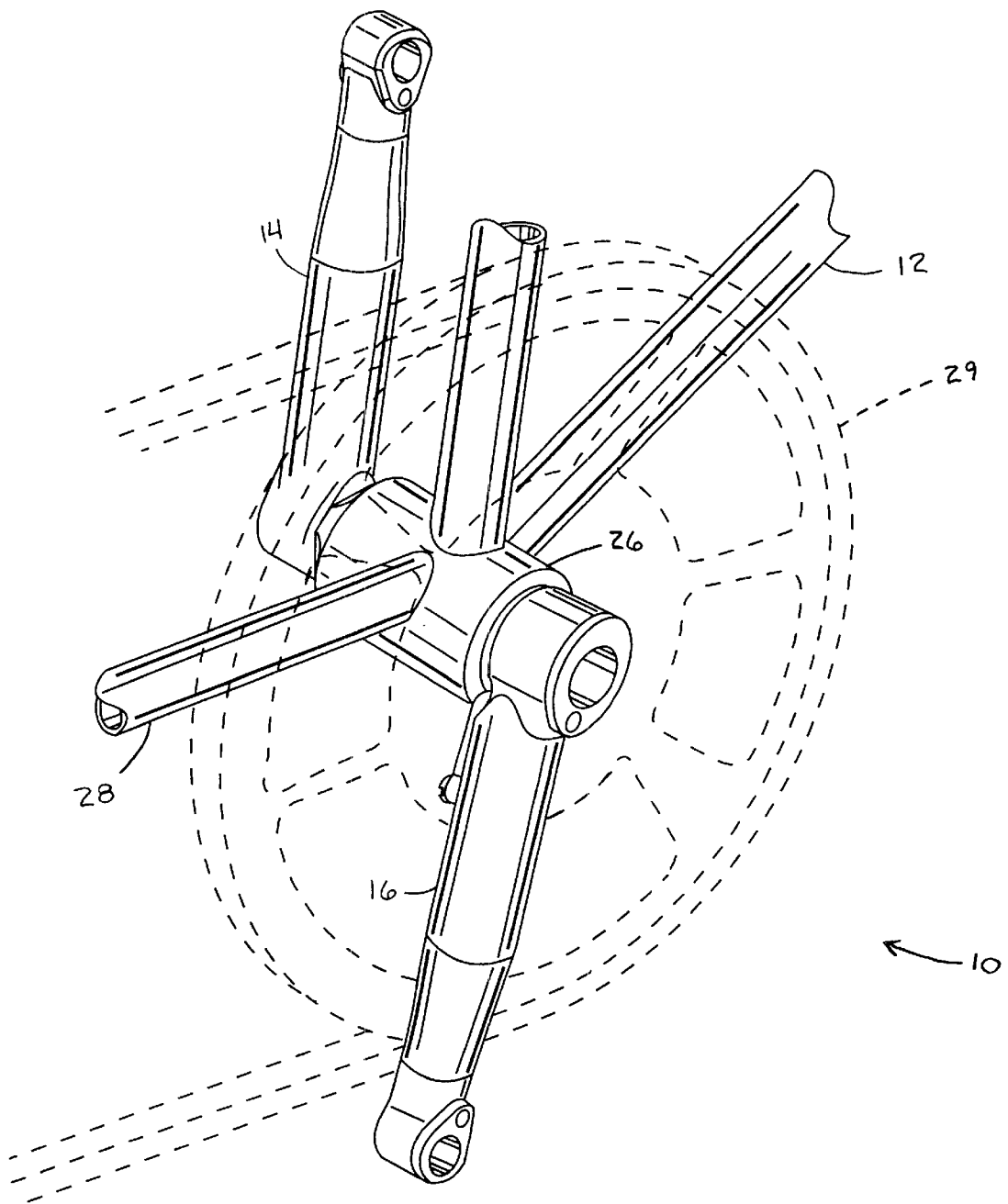
FIG. 1 is a perspective view of an expansion engagement crank assembly mounted within a bottom bracket of a bicycle frame.
Figure 2:
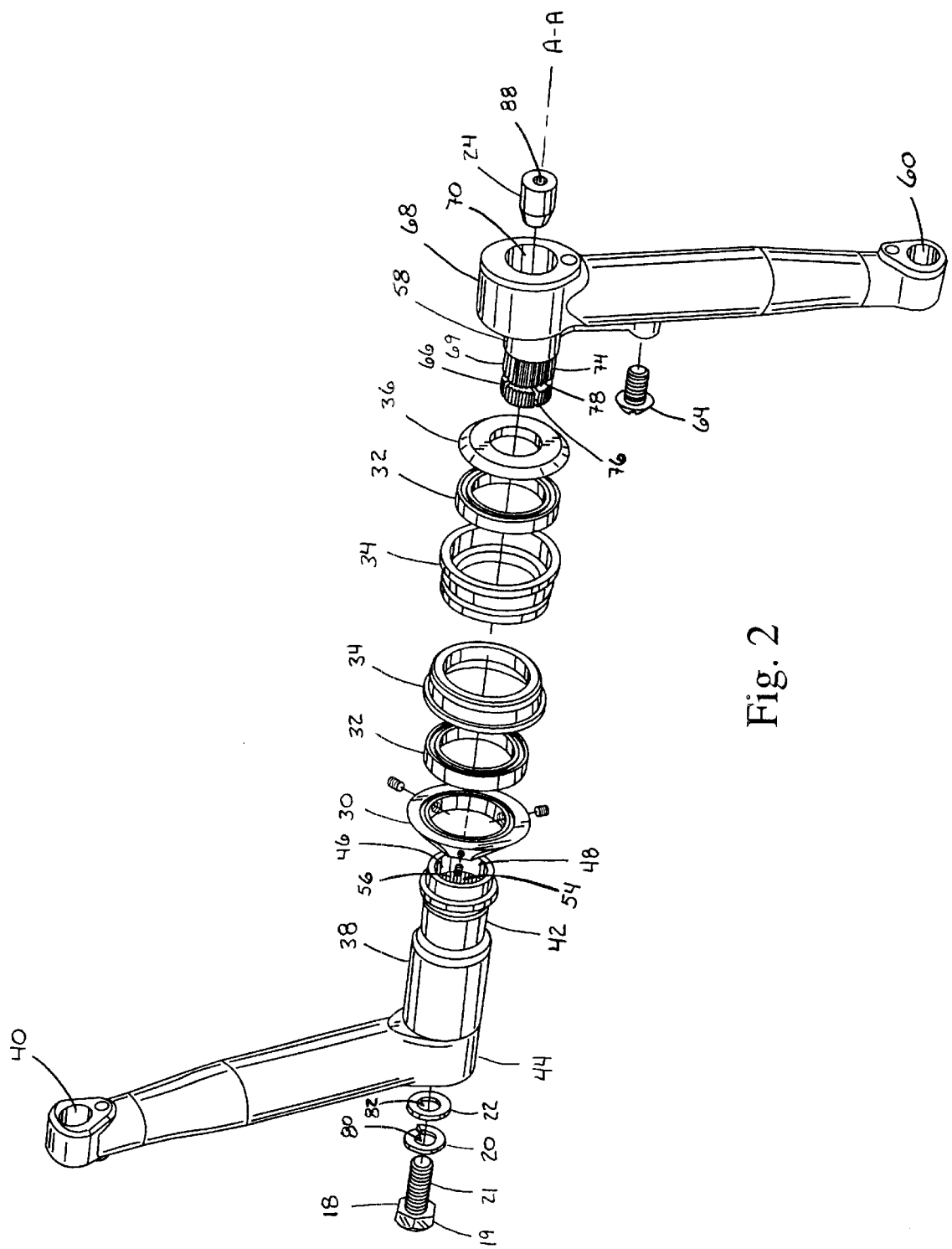
FIG. 2 is an exploded perspective view of the assembly of FIG. 1.
Figure 3:
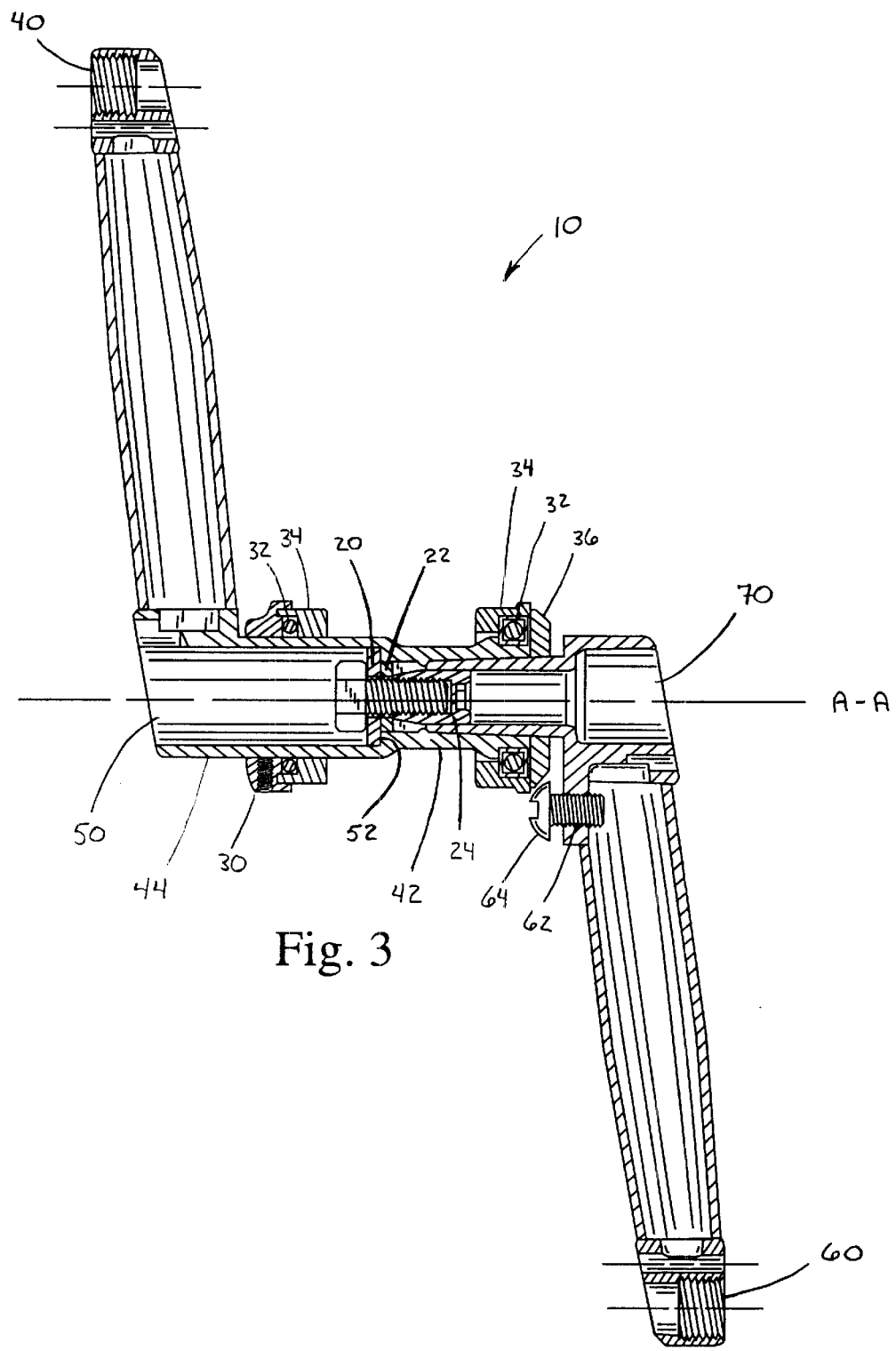
FIG. 3 is a cross-sectional front view of the crank assembly and bottom bracket of FIG. 1.

Referring to FIGS. 1–3, an expansion engagement crank assembly 10 for a bicycle 12 (not shown in its entirety) is illustrated. The assembly 10 includes a female crank arm 14, a radially expandable male crank arm 16, and a connector for connecting the female arm, 14 and male arm 16. The connector can include a standard hex fastener 18 having a head portion 19 and a threaded body portion 21, a standard spring lock washer 20, a standard ring washer 22, and a frustum conical shaped expander 24.

Referring to FIGS. 1 and 2, the assembly 10 is rotatabrly mounted within a generally cylindrical bottom bracket 26 of a bicycle frame 28 (not shown in its entirety) The bottom bracket 26 can include a thrust bearing 30, a pair of race bearings 32, a pair of race retainers 34, and a spacer ring 36 for rotatably mounting the assembly 10. A chain drive sprocket 29 (shown. in phantom) is also attached to the assembly 10 such that the sprocket 29 and assembly 10 rotate in unison.

Referring now to FIGS. 2 and 3, one end of the female arm 14 has an attached, generally cylindrical shaft sleeve 38 and the opposite end can be provided with a pedal mount 40. The pedal mount 40 can be a standard threaded hole for engaging a standard threaded pedal fastener (not shown). The sleeve 38 can be integrally attached to the female crank arm 14 and oriented approximately perpendicular to the female arm 14. With this orientation, the female arm 14 and pedal (not shown) will be conveniently disposed for efficient pedaling.

Referring again to FIGS. 2 and 3, the sleeve has an inboard end 42, and outboard end 44, and a bore 46 originating at the inboard end and longitudinally extending along an axis A—A. In the preferred embodiment, the bore 46 passes through the sleeve 38 to the outboard end 44. The bore 46 can be formed with a narrow portion 48 disposed within the inboard end 42 and an enlarged portion 50 disposed within the outboard end 46. As will be explained in greater detail below, the enlarged portion 50 is sized to receive the hex fastener 18, lock washer 20, and ring washer 22, and additionally to permit insertion of a tool for turning the fastener 18. The enlarged portion 50 is also bounded by a fastener surface 52, which in this embodiment is a flat, annular shelf that functions as a seat for the lock washer 20. The narrow portion, 46 is sized to flushly receive the ring washer 22 and the body portion 21 of the hex fastener 18. The narrow portion 46 is also bounded by a mating surface 54. As shown in FIG. 2, the mating surface 54 can be splined, that is, it has a plurality of longitudinally extending and spaced apart ridge projections, or splines 56.

Figure 4:
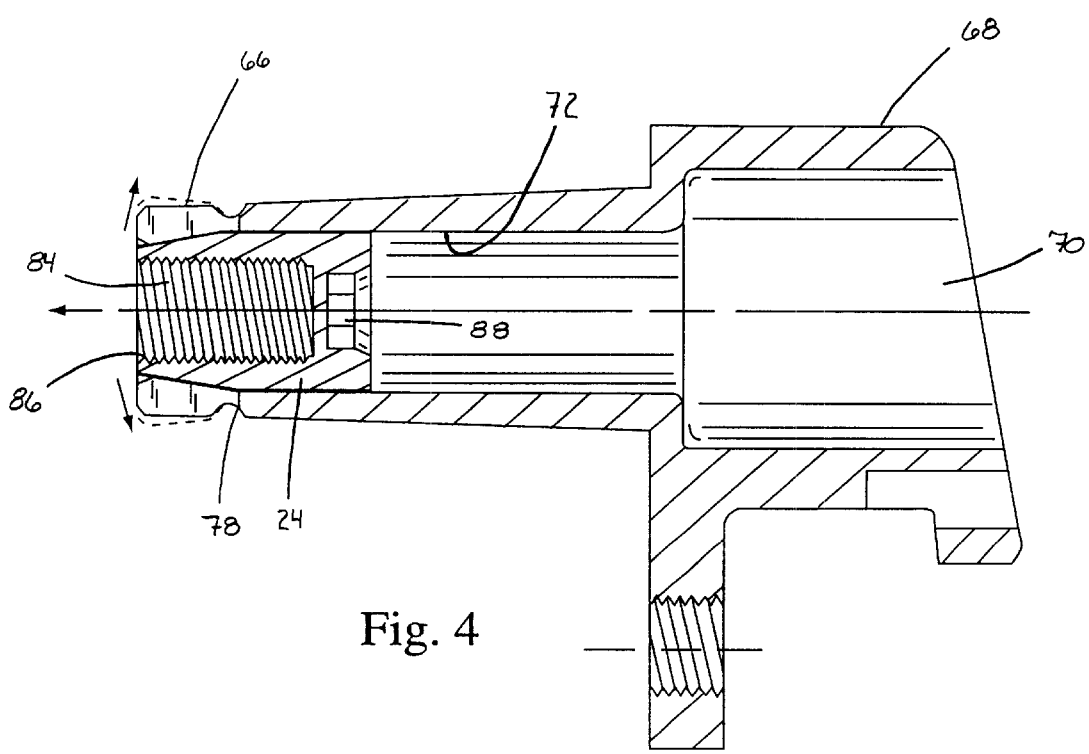
FIG. 4 is a cross-sectional side view of a male crank arm from the assembly of FIG. 1.

Referring now to FIGS. 2 and 4, one end of the male arm 16 has a generally cylindrical shaft 58 and the other end can be provided with a pedal mount 60. As above the pedal mount 60 can be a standard threaded bore for engaging a standard pedal fastener (not shown). Likewise, the shaft 58 can be integrally attached to the male arm 16, and oriented approximately perpendicular to the male arm 16. The male arm 16 can also be provided with a threaded fastener hole 62 for attaching the chain drive sprocket 29 with a standard fastener 64. It is recognized, of course, that the female arm 14 can also be provided with a similar threaded fastener hole so the drive sprocket can be attached to the female arm 14 instead.

Referring again to FIGS. 2 and 4, the shaft 58 has a radially expandable inboard end 66, an outboard end 68, and a passage 70 extending from the inboard end 66 to the outboard end 68. The passage 70 is defined by an interior coupling surface 72, and the inboard end of the coupling surface 72 has a frustum conical shape to flushly engage the expander 24. With this configuration, the frustum conical shaped expander 24 can be advanced within the passage 70 to expand the inboard end 66.

The shaft 58 also has a compatibly splined exterior mating surface 74 for cooperatively engaging the splined mating surface 54 of the sleeve 38. The shaft is additionally so sized with an outside diameter such that the inboard end 66 of the shaft 58 can be inserted within the sleeve 38 and then radially expanded into an engaged position with the sleeve 38. With this type of engagement, the shaft 60, shaft splines 69, sleeve splines 54, and bore 46 can be machined less precisely. Specifically, tight cooperative engagement between the splines 54, 69 can be achieved by expanding the shaft 60, even if the diameter of the shaft 60 and the height of the splines 54, 69 are slightly undersized, or if the diameter of the bore 46 is slightly oversized. Furthermore, expansion engagement minimizes the size and number of gaps between individual splines because the shaft 58 is expanded until the splines 54, 69 are engaged to the fullest extent possible. Thus, when the splines 54, 69 have a thicker base portion, the expansion process promotes greater contact between the splines at their base. Moreover, with fewer and smaller gaps between the splines, the assembly 10 will operate more smoothly and more efficiently. In addition, because there is a tighter fit, there will be less bumping and grinding of the splines 54, 69.

Referring again to FIGS. 2 and 4, the inboard end 66 of the shaft 58 can be formed with longitudinally extending expansion slits 76 and a circumferential expansion groove 78 to facilitate radial expansion. The expansion groove 78 preferably has a rounded profile to eliminate corners, which can concentrate stress and promote cracking after repeated flexing.

As shown in FIGS. 2. and 3, the lock washer 20 is sized for seating against the fastener surface 52. The ring washer 22 is sized for flush placement within the narrow portion 48 of the bore 46 and functions as a spacer and to radially support to the sleeve 38. Both washers 20, 22 respectively have apertures 80, 82 for receiving the threaded body portion 21 of the hex fastener 18. The head portion 19 of the hex fastener 18 is sized to compressively engage the lock washer 20.

Referring to FIG. 4, the expander 24 has a hole 84 bounded by a threaded surface 86 which is engageable with the threaded body portion 21 of the hex fastener 18. As described above, the expander 24 can have a frustum conical shape to engage the coupling surface 72 of the shaft 58. The expander 24 can also be provided with a tool recess 88 such as a standard allen wrench recess, so that a tool (not shown) can be inserted into the recess 88 to prevent the expander 24 from rotating as it is being engaged with the hex fastener 18. In this manner, engagement of the fastener 18 and the expander 24 draws the expander 24 into the passage 70 for expanding the inboard end 66 of the shaft 58. The frustum conical shape of the coupling surface 72 additionally prevents the expander 24 from exiting the passage 70 so the fastener 18, lock washer 20, and expander 24 can connect the female arm 14 and male arm 16. With this configuration, the expander 24 also radially supports the shaft 58 and sleeve 38 to fix the splines 56, 69 in an engaged position and to prevent bending and distortion of the engaged working surfaces.

The female crank arm 14, male crank arm 16, and connector can be constructed from resilient materials such as steel, aluminum, titanium or similarly resilient materials capable of withstanding the stresses generated by pedaling. The shaft 58 and shaft sleeve 38 can also be constructed from high hardness materials such as steel and titanium to further protect the splines 56, 69 from rounding and gouging.

It is recognized, of course, that other types of connectors can be employed, and that the shaft sleeve 38 and shaft 58 can be otherwise configured. For instance, the lock washer 20 and ring washer 22 can be eliminated if the head portion 19 of the fastener 18 is sized to directly engage the fastener surface 52. Alternatively, the connector can be a threaded, frustum conical shaped fastener sized for insertion into the passage 70 of the shaft 58. For this type of connector, the bore of the shaft sleeve 38 could neck down to a narrow cylindrical section terminating within the odutboard end 44 of the sleeve 38 and the narrow section would be bounded by a threaded fastener surface for engaging the tapered fastener. Thus, the female arm 14 and male arm 16 would be connected, and the male arm 16 would be expanded into an engaged position with the female arm 14, by advancing the tapered fastener into an engaged position within the narrow section.

In use, the shaft 58 of the male arm 16 is inserted through the bottom bracket 26, the bottom bracket mounting elements, the chain drive sprocket (not shown), and then into the bore 46 of the shaft sleeve 38. The bottom bracket mounting elements can include a thrust bearing 30, a pair of race bearings 32, a pair of race bearing retainers 34, and a spacer 36. The chain drive sprocket is mounted between the spacer 36 and the outboard end 68 of the shaft 58, and is additionally attached to the male arm 16 with the sprocket fastener 64. The expander 24 is next inserted into the passage 70 disposed in the shaft 58 such that the frustum conical surface of the expander 24 abuts the frustum conical coupling surface 72. The ring washer 22 is then placed within the narrow portion 48 of the bore 46, and the lock washer 20 and fastener 18 are placed within the enlarged portion 50 of the bore 46 to seat against the fastener surface 52. The user can then engage the fastener 18 and expander 24 by rotating the fastener 18 with a standard socket wrench or ratchet and simultaneously gripping the expander 24 with a standard allen wrench inserted into the tool recess 88. In this manner, the expander 24 can be drawn into the frustum conical shaped passage 70 to expand the shaft splines 69 into an engaged position with the sleeve splines 56. In addition, the frustum conical shape of the coupling surface 72 will prevent the expander 24 from entering the sleeve 38 such that the male arm 16 and female arm 14 will be rigidly connected to each other.

Thus, while it is recognized that an illustrative and preferred embodiment has been described herein, it is likewise to be understood that the inventive concepts may be otherwise embodied and employed and that the appended claims are intended to be construed to include such variations except insofar as limited by the prior art.

What is claimed is:

1. An expansion engagement crank assembly for a bicycle, the assembly comprising:

a) a female crank arm having a shaft sleeve attached at one end, the shaft sleeve having an inboard end, an outboard end, and a bore originating at the inboard end, the bore being bounded by a mating surface and a fastener surface and extending through the female arm from the inboard end to the outboard end;

b) a male crank arm having a shaft attached at one end, the shaft having a radially expandable inboard end and an outboard end, the inboard end being sized for insertion within the bore of the shaft sleeve and having a complimentary mating exterior surface for engaging the mating surface bounding the bore, the shaft additionally having an interior coupling surface defining a passage extending through the shaft from the inboard end to the outboard end; and c) a connector sized for placement within the bore of the shaft sleeve and the passage of the shaft, the connector further comprising a fastener, a spring lock washer, a ring washer, and an expander, the expander being shaped for insertion into the passage of the shaft to engage the coupling surface bounding the passage and having a hole bounded by a threaded surface, the ring washer being sized for placement within the bore of the shaft sleeve and having an aperture, the lock washer having an aperture and shaped to engage the fastener surface bounding the bore of the shaft sleeve, the fastener being sized for insertion into the bore of the shaft sleeve, the fastener having a head portion engageable with the lock washer and a threaded body portion sized for insertion through the aperture of the lock washer and the aperture of the ring washer to engage the threaded surface bounding the hole of the expander.

2. The assembly as claimed in claim 1 wherein the coupling surface of the shaft has a frustum conical shape and the expander has a complimentary frustum conical shape for engaging the coupling surface.

3. The assembly as claimed in claim 2 wherein the mating surface of the shaft has a circumferential expansion groove.

4. The assembly as claimed in claim 3 wherein the radially expandable inboard end of the shaft has a plurality of extending expansion slits.

5. The assembly as claimed in claim 4 wherein the expander additionally has a tool recess disposed opposite the hole.

* * * * *